United States Patent [19]

Milner

[11] Patent Number: 5,359,614
[45] Date of Patent: Oct. 25, 1994

[54] VARIABLE EMISSIVITY LASER THERMAL CONTROL SYSTEM

[75] Inventor: Joseph R. Milner, Livermore, Calif.

[73] Assignee: The United States of America as Represented by the Department of Energy, Washington, D.C.

[21] Appl. No.: 311

[22] Filed: Jan. 4, 1993

[51] Int. Cl.⁵ .......................... H01S 3/04; H01S 3/22
[52] U.S. Cl. ........................................ 372/35; 372/56
[58] Field of Search ...................... 372/34, 35, 33, 31, 372/56

[56] References Cited

U.S. PATENT DOCUMENTS

| | | | |
|---|---|---|---|
| 4,794,614 | 12/1988 | Maitland et al. | 372/56 |
| 4,815,091 | 3/1989 | Hara et al. | 372/56 |
| 4,897,851 | 1/1990 | Vecht et al. | 372/35 |
| 5,117,434 | 5/1992 | Oohashi et al. | 372/35 |

Primary Examiner—James W. Davie
Attorney, Agent, or Firm—Isabelle R. McAndrews; Roger S. Gaither; William R. Moser

[57] ABSTRACT

A laser thermal control system for a metal vapor laser maintains the wall temperature of the laser at a desired level by changing the effective emissivity of the water cooling jacket. This capability increases the overall efficiency of the laser.

17 Claims, 5 Drawing Sheets

VARIABLE EMISSIVITY LASER THERMAL CONTROL SYSTEM

FIELD OF THE INVENTION

The United States Government has rights in this invention pursuant to Contract No. W-7405-ENG-48 between the United States Department of Energy and University of California for operation under Lawrence Livermore National Laboratory.

BACKGROUND OF THE INVENTION

The present invention relates to a laser thermal control system, and more particularly to a variable emissivity laser thermal control system. Emissivity is the ratio of the radiation emitted by a surface to the radiation emitted by a black body at the same temperature and under similar conditions.

A laser is a thermal device which is extremely sensitive to temperature variations. As the wall temperature of a laser increases from an optimal value, the output power capability of the laser (in watts) significantly decreases. Typically, metal vapor lasers operate optimally only in a range within ±30° C. of a desired temperature. The insulation used in metal vapor lasers is typically within 20% of its nominal value. This is the tolerance of the insulation and not subject to modification. As a result, the pulsed power electronics which drives a metal vapor laser is typically designed to provide pulsed power above the maximum thermal operating point of the laser. This takes into account the insulation tolerance. Thus, prior art lasers are usually designed with a sub-optimal amount of-insulation. With too much insulation, or even optimal insulation, a prior art laser may operate at excessively high temperatures, requiring a reduction in input power to run the laser at the proper operating temperature. With too little insulation, a prior art laser operates at excessively cold temperatures, even with maximum power electronics input. The lack of sufficient insulation results in an inability to achieve a proper laser operating temperature even with maximum pulsed power input. Currently, lasers are operated at about 20% more insulation than is necessary in order to reduce the input pulsed electronics power and still achieve proper operating temperatures. Prior art laser power supplies are thus operated at less than their maximum capacity and consequently underutilize the available pulse power electronics.

The disadvantages of the temperature constraints on prior art lasers are overcome in accordance with the present thermal control system which enables a laser to operate at its full pulsed electronics power. In this regard, the thermal control system is designed to operate at a power level that corresponds to the aforesaid tolerance level of the insulation. In short, to maintain the same laser optimal operating temperature, the input power delivered to the prior art laser is reduced. In accordance with this invention, full pulsed electronics power, e.g. 40 KW, is input into the laser, then the laser operating temperature is gradually increased using a variable emissivity system of vanes and foils until the optimal temperature is attained. If higher power is input into the laser, such as 50 KW, the prior art result would be higher temperatures and eventually lead to a decline in laser output power; however, in this laser, the operating temperature is reduced using the variable emissivity system. Lasers designed in accordance with the present invention operate much more efficiently than the methods and apparatuses of the prior art. In the prior art, only about two-thirds of the available pulsed electronics power is utilized for driving the metal vapor laser. Because metal vapor lasers are expensive to build and operate, the aforementioned limitations are significant factors to consider for monitoring the cost and performance of lasers.

SUMMARY OF THE INVENTION

It is an object of the present invention to provide a laser thermal control system for a metal vapor laser.

It is a more particular object of the present invention to provide a thermal control system for a metal vapor laser which maintains the wall temperature of the laser discharge tube substantially at a desired level, primarily at or substantially near the maximum pulsed electronics operating power level.

The present system includes means for changing the effective emissivity of the laser depending upon the operating temperature of the laser or the output power level of the laser discharge tube.

Additional objects, advantages and novel features of the present invention will become apparent from the following detailed description when taken in conjunction with the accompanying drawings.

BRIEF DESCRIPTION OF THE DRAWINGS

The accompanying drawings illustrate an embodiment of the invention and, together with the description, serve to explain the principles of the invention.

DETAILED DESCRIPTION OF THE DRAWINGS

Reference will now be made in detail to the preferred embodiment of the invention, an example of which is illustrated in the accompanying drawings. While the invention will be described in conjunction with the preferred embodiment, it is understood that the description is not intended to limit the invention to that embodiment, but to cover alternatives, modifications and equivalents within the spirit and scope of the invention.

Figure 1A:
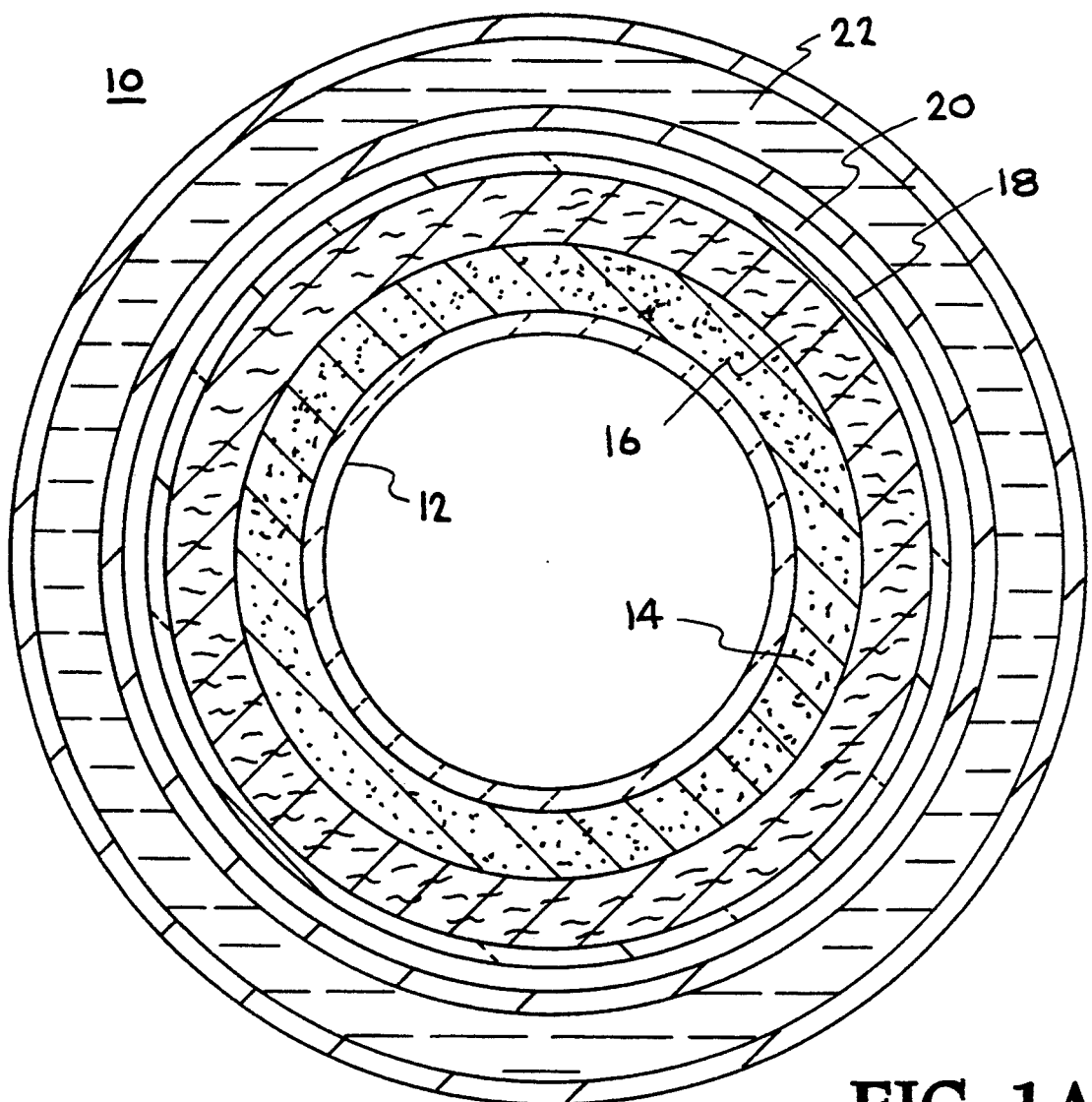
FIG. 1A is a cross-section of a metal vapor laser known in the prior art.
Figure 1B:
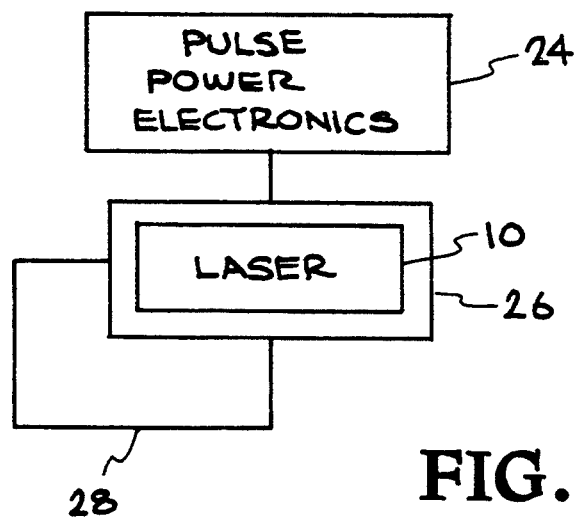
FIG. 1B is a diagram of a laser driven by pulse power electronics.

FIG. 1A shows a cross-section of a metal vapor laser 10 of the prior art. The laser is constructed of an interior alumina plasma tube 12, surrounded by a stack of layers including small diameter alumina powder (known as backfill) 14, fibrous insulation material (produced by Zircar) 16, and a quartz vacuum containment tube 18. The quartz tube 18 radiates heat through air to an exterior water-cooled jacket 22. FIG. 1B is a diagram of a laser driven by pulse power electronics. The operation of metal vapor lasers is well known. The limitations of such lasers in terms of laser output power will now be described in conjunction with FIG. 2.

Figure 2:
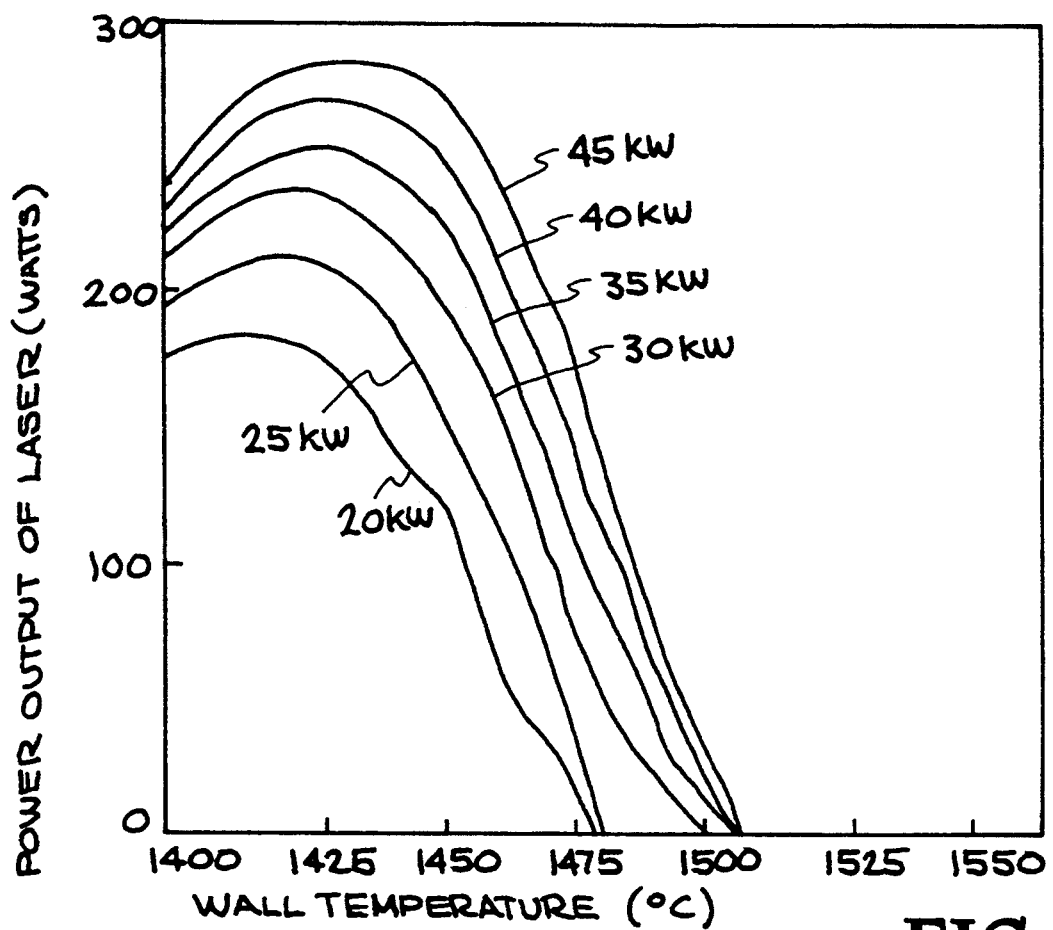
FIG. 2 is a diagram of laser output power versus wall temperature.

FIG. 2 is a diagram of laser output power versus wall temperature of a typical metal vapor laser, such as the laser 10 of FIG. 1A. The thermal system between the plasma tube 12 and the quartz tube 18 of laser 10 is very difficult to alter. The particular components of such lasers (plasma tube 12, backfill 14, Zircar 16, and quartz tube 18) contain variations in their respective thermal performances that contribute to variations in the overall thermal conductivity. For example, the Zircar material itself can vary by as much as ±20%, which requires the laser to be underdesigned by approximately the same variation. Therefore, it is very difficult (if at all possible) to control the insulation stack of FIG. 1A in order to maintain a constant power flux at constant wall temperature.

By utilizing the water jacket 22 of FIG. 1A there is no control over the wall temperature of the laser 10. However, by varying the emissivity of the water jacket 22, the overall operation of the laser can be dramatically increased.

FIG. 2 is a diagram of laser output power in watts versus wall temperature in degrees Celsius. It is known that the operation of a laser can be dramatically affected by the amount of electrical power applied as shown in FIG. 2.

Output power is dependent upon the amount of pulse power applied (in terms of kilowatts). FIG. 2 depicts the output power of a laser in terms of electrical power ranging from 20kW to 45 kW. For increases in laser wall temperature at above approximately 1425°–1450° C., the output power of the laser (in terms of watts) declines dramatically. The parabolically shaped curves of FIG. 2 illustrate that as the wall temperature of the laser increases above a desired or maximum output power point, the output power of the laser dramatically decreases, regardless of the level of input pulse power applied.

It is for the foregoing reasons that the efficiency of the laser can be dramatically affected as the wall temperature increases. The present invention provides a means for dramatically improving laser operation by maintaining the wall temperature at a desired or optimum value, independently of the pulse power applied to the laser.

Figure 3:
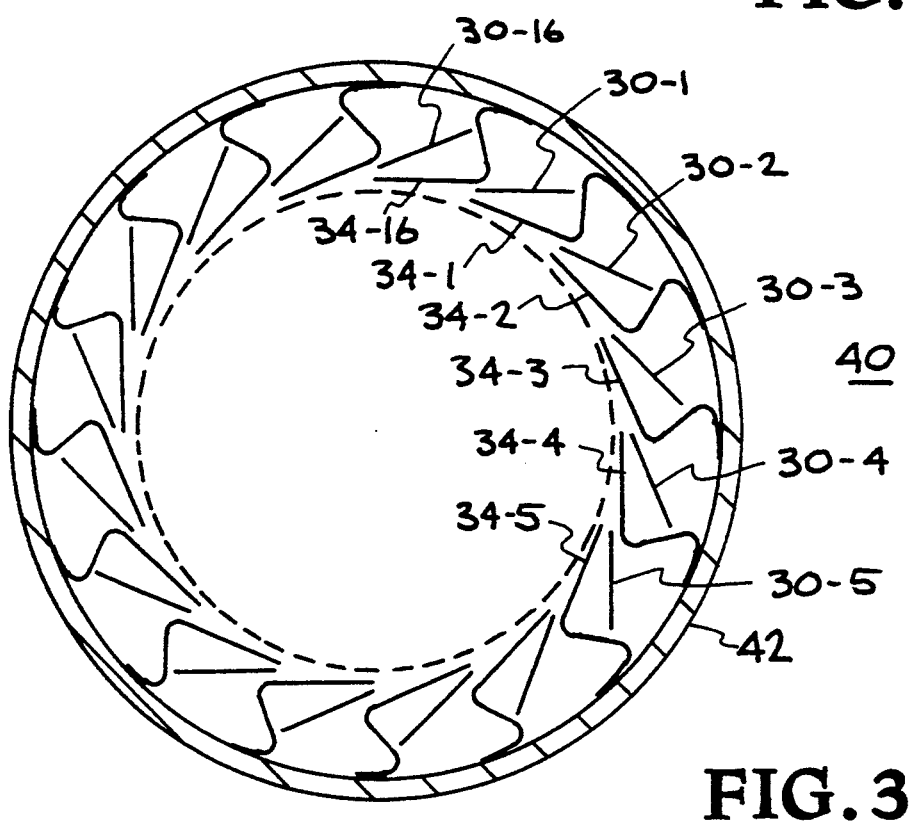
FIG. 3 is a cross-sectional view of a laser thermal control system according to the present invention.

FIG. 3 is a cross-sectional view of the improved laser thermal control system according to the present invention. The thermal control system of the present invention includes a series of gold coated metal foils 30 which are slidable in front of a respective series of black-colored vanes 34 having an S-shape arrangement. The gold coating is performed by first degreasing the foils, preferably Hastelloy C for 10 minutes, depositing 7500 angstroms of gold, baking the coating in air at 750° C. for two hours and then depositing a second layer of gold on the first layer. The second layer is preferably 7500 angstroms thick.

At one extreme, laser 40 operates in its coldest configuration when the black surfaces of the vanes 34 are completely exposed. At the other extreme, by moving the foils 30 in front of the respective vanes 34, nearly all of the heat will be reflected back into laser 40. As a result, the wall temperature of the plasma tube is raised so that proper operating conditions can be reached.

The thermal control system is preferably located in place of the water jacket 22 in the conventional metal vapor laser shown in FIG. 1A.

By using a variable emissivity laser thermal control system according to the present invention, it can be determined from FIG. 2 where the proper or desired operating point of the laser can be maintained, independent of the pulse power electronics applied to the laser.

By changing the effective emissivity of the laser itself, approximately 50% more average pulse power can be applied to the laser to obtain a 26% improvement in the output laser power (there is a non-linear relationship between the pulse power electronics and the output power of the laser).

The S-shaped curve vanes 34 in FIG. 3 are attached to the inside diameter of the water jacket 42 (both thermally and electrically). Coating the S-shaped curves with black paint effectively renders a black body having an emissivity of approximately 1. Such an emissivity value provides ideal thermal absorption of radiant heat from the quartz jacket 18. The S-shaped curves are made of metal to effectively conduct any absorbed radiant heat flux to the water cooled jacket 35 without a significant temperature rise. Preferably, the S-shaped curves are composed of aluminum for high electrical and thermal conductivity.

FIG. 3 shows that each of the S-shaped curve vanes 34 has a corresponding foil 30 which has a very low emissivity (approximately 0.03). The foils 30 are preferably composed of a metal that has high strength at high temperatures and more preferably gold-coated metals. A suitable metal is Hastelloy C a trademark of Union Carbide Corporation. Hastelloy C is such a high strength, high-temperature, nickel-base, corrosion resistant alloy.

A tensile force is applied to foil 30 because otherwise the foil 30 could tend to droop and/or sag, resulting in unwanted contact, for example, with the quartz tube 48, which could further result in an undesirable electric field stress and possible resultant arc formation and consequential damage to the laser. The dashed lines in FIG. 3 are the outer tolerances of the foil 30.

Figure 4:
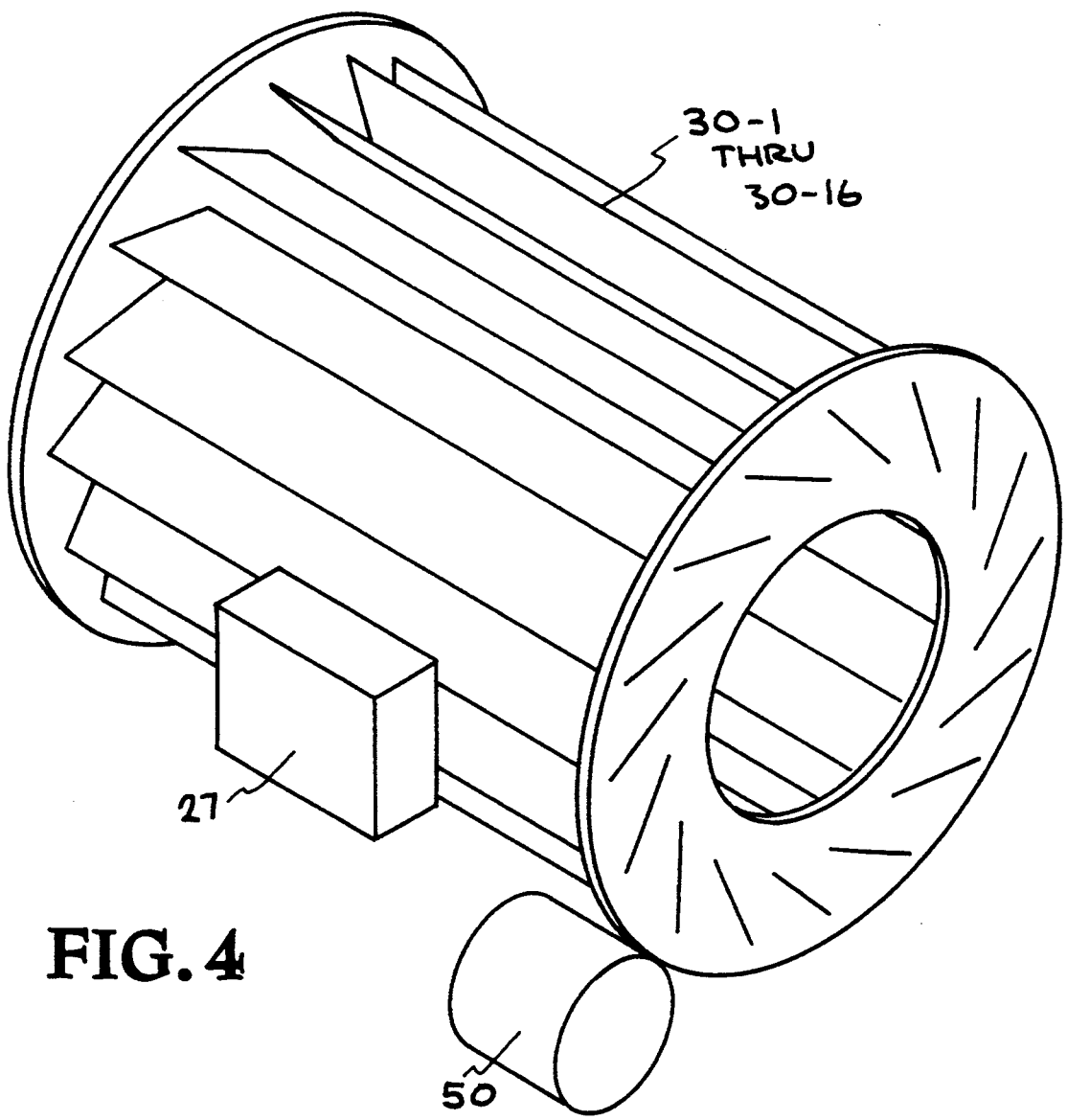
FIG. 4 is a perspective view of the system of FIG. 3.

FIG. 4 is a partial perspective view of the invention shown in FIG. 3. A motor controller 27 controls the output device which moves vanes 34.

Figure 5:
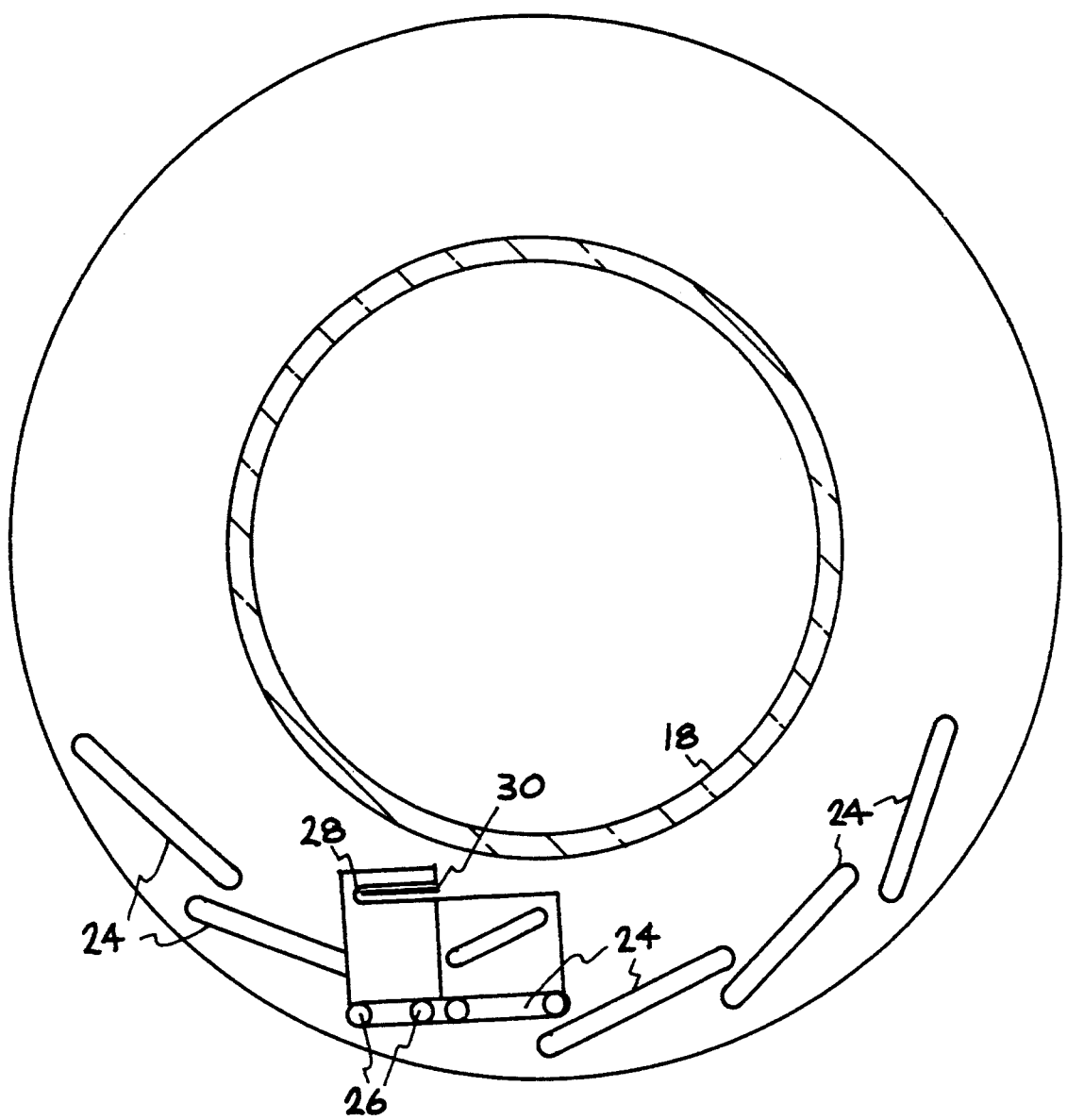
Fig 5 is a cross section of the laser and a foil in accordance with the present invention.
Figure 6:
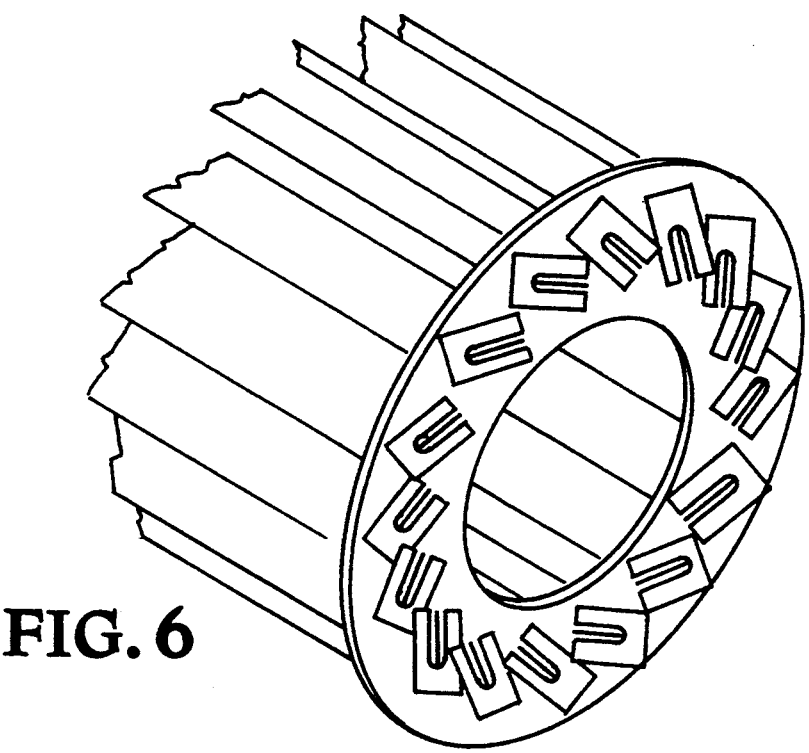
FIG. 6 is a cross-sectional view of the system of FIG. 5.

Referring now to FIGS. 5 and 6, there is depicted a view of a transportable foil 30 which forms a portion of FIG. 3.

FIG. 5 shows the movement of one of the foils 30 of FIG. 3. In a preferred embodiment, the foils are moved by actuating guide pins 26. Guide pins 26 are located along guide roller 24. When the foil 30 is fully retracted, it occupies recess 28 and the black body vanes are exposed to the laser. In this condition, the laser will operate in its coldest configuration. On the other hand, when the foils 30 are withdrawn from recess 28 and fully extended to cover the respective vanes 34, the emissivity of the system changes. When foil 30 is fully extended, the laser is caused to operate at a higher temperature configuration. By appropriately moving the foils with respect to the vanes, the laser emissivity can be changed so that the optimum operating temperature point can be determined.

As a foil 30 fully extends over a respective one of the black vanes 34, along the axial length of the laser 40, more and more of the laser's radiated energy is reflected back to the laser 40. The heat flow is constant in the operation of the present invention, but because the emissivity is changed with the constant heat flow, the quartz tube 18 of the laser 10 goes through large adjustable temperature variations. As a result of the quartz tube 18 temperature variations, the plasma tube changes temperatures thus optimizing the laser thermal conditions.

In a preferred embodiment, there are 16 corresponding vanes 34 and foils 30 which are actuated with respect to one another by an actuator 50 depicted in FIG. 3. Thus, sixteen foils (30-1, 30-2, ..., 30-16) are slidable over a respective vane (34-1, 34-2, ..., 34-16).

The control of such an actuator system can be provided by suitable control circuitry which need not be described in great detail. In operation, the laser will effectively be exposed to a variable emissivity range between about 0.03 and about 1. The variation in emissivity may improve the operation of the laser dramatically.

Figure 7:
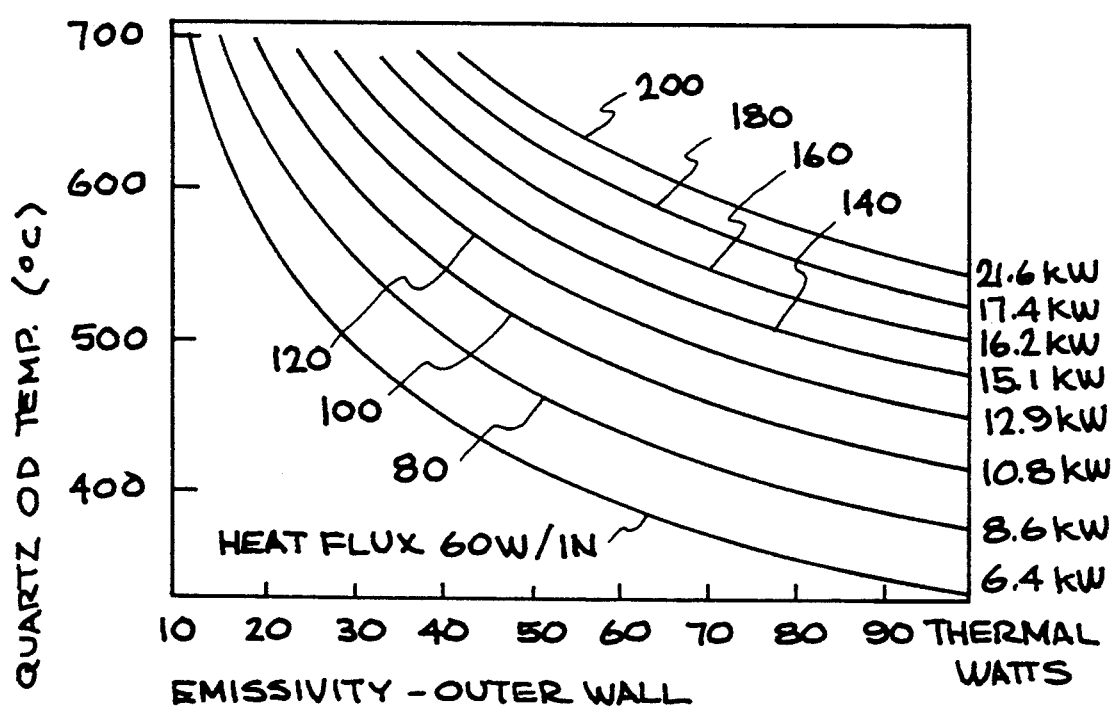
FIG. 7 is a diagram of emissivity design space.

FIG. 7 is a plot of emissivity design space where the emissivity of the outer wall quartz tube 18 of the laser 10 changes in value with respect to a constant power flux into the laser. FIG. 7 also shows that the outer diameter temperature of the quartz tube changes dramatically when the emissivity of the outer wall of the water jacket changes.

In operation, there are two feedback approaches for determining whether the laser is at its maximum operating point with respect to temperature. The first approach is to determine the optical output power of the laser (see FIG. 2).

The second approach is to determine the actual operating temperature of the laser and then change the laser's emissivity accordingly. The laser emissivity is changed by extending the foils 30 across the vanes 34 of FIG. 3 as appropriate.

The means for sensing or determining an optimal laser wall temperature using the output power of the laser may be incorporated into the present invention by one of ordinary skill in the art. Only with much more difficulty, may the skilled artisan determine optimal laser wall temperatures using the laser temperature itself. A feedback arrangement is shown in FIG. 1B, wherein the output power or laser temperature serves as a feedback 28 to the pulse power electronics 24.

The present invention may achieve significant efficiency factors. For example, in Atomic Vapor Laser Isotope Separation (AVLIS), many lasers are multiplexed together in a photoionization process. Such lasers have the same problem as previously described, in that the capability of the system requires its operation be under designed with the pulse power electronics being utilized.

The average pulse power utilization in an AVLIS process is approximately two-thirds. By utilizing a variable emissivity control configuration, according to the present invention (independently of the pulse power electronics), it is believed that the laser output efficiency can be increased approximately 26%.

The present invention could be utilized in existing laser systems, as the aspects of the invention lend toward retrofitting capabilities. Furthermore, the aspects of the present invention can relate to any thermal radiation heat transfer system when utilizing the variable emissivity aspects as described hereinabove.

The foregoing description of the preferred embodiment of the invention has been presented for purposes of illustration and description. It is not intended to be exhaustive or to limit the invention to the precise form disclosed, and many modifications and variations are possible in light of the above teaching.

The preferred embodiment was chosen and described in order to best explain the principles of the invention and its practical applications to thereby enable others skilled in the art to best utilize the invention and various embodiments, and with various modifications as are suited to the particular use contemplated. It is intended that the scope of the invention be defined only by the claims appended hereto.

What is claimed is:

1. A laser thermal control system for a laser discharge tube comprising means for maintaining a plasma wall temperature of said laser discharge tube substantially at a desired level independent of power applied to said laser, including means for changing an effective emissivity of said discharge tube using radiative heat transfer.

2. A laser thermal control system for a laser discharge tube, comprising a plurality of vanes having a first emissivity value, said vanes axially oriented about said laser discharge tube and a plurality of foils having a second emissivity value different from said first emissivity value, each of said foils being slidable over a respective one of said vanes, thereby providing a variable emissivity for said laser discharge tube.

3. The system of claim 2, wherein said thermal control system surrounds an insulated laser discharge tube.

4. The system of claim 2, including actuation means for translating said foils between first and second predetermined points.

5. The system of claim 2, comprising sixteen foils and sixteen vanes.

6. The system of claim 2, wherein said foils are metallic.

7. The system of claim 6, wherein said foils are fabricated out of a nickel-based corrosion-resistant alloy.

8. The system of claim 6, wherein said foils are coated with gold.

9. The system of claim 4, wherein movement of said foils between said first and second predetermined points results in a variable emissivity range between about 0.03 and about 1.

10. The system of claim 9, wherein said first emissivity value is approximately 1.

11. The system of claim 9, wherein said second emissivity value is approximately 0.03.

12. The laser thermal control system of claim 1, wherein said means for changing said effective emissivity comprises maintaining the temperature of said laser tube at said desired level.

13. The laser thermal control system of claim 1, wherein said means for changing said effective emissivity comprises controlling the output power level of said laser.

14. A laser thermal control system comprising:
a metal vapor laser having a plasma tube, backfill, fibrous insulation material and a quartz vacuum containment tube, and
means for maintaining the wall temperature of said laser discharge tube substantially at a desired level independent of power applied to said laser, including means for changing an effective emissivity of said laser.

15. The laser thermal control system of claim 14, wherein said means for changing said effective emissivity comprises maintaining the temperature of said laser tube at said desired level.

16. The laser thermal control system of claim 14, wherein said means for changing said effective emissivity comprises controlling the output power level of said laser.

17. A method for maintaining a laser at a desired temperature comprising applying an initial amount of power to an insulated laser to operate at less than 1400° C., then increasing said power by controlling laser emissivity until a predetermined optimal attained.

* * * * *